United States Patent [19]
Sandstrom et al.

[11] 3,823,730
[45] July 16, 1974

[54] ALIGNMENT CONTROL SYSTEM
[75] Inventors: John W. Sandstrom, Dallas; Kenneth C. Cloud, Garland, both of Tex.
[73] Assignee: Integral Systems, Inc., Dallas, Tex.
[22] Filed: Mar. 30, 1973
[21] Appl. No.: 346,425

[52] U.S. Cl............................. 137/344, 239/212
[51] Int. Cl..... A01g 25/02, B05b 15/06, B05b 9/02
[58] Field of Search.................. 137/344; 239/212

[56] References Cited
UNITED STATES PATENTS
3,394,729  7/1968  Bower et al..................... 137/344

*Primary Examiner*—Henry T. Klinksiek
*Attorney, Agent, or Firm*—Kenneth R. Glaser

[57] ABSTRACT

Disclosed is an electronic control system for maintaining linear alignment of adjacent fluid conduit sections being reversibly driven, particularly in a pivotal irrigation system, and for interrupting power to the drive means when the sections are in excessive misalignment. A photodetector or potentiometer sensor assembly coupled to the sections serve as pivotal detectors, and a phase detection network serves as a directional detector, the outputs of which are coupled to a logic comparator for selectively energizing drive means coupled to intermediate sections for bringing adjacent sections into alignment.

40 Claims, 7 Drawing Figures

ALIGNMENT CONTROL SYSTEM

The present invention relates generally to self-propelled fluid distribution systems, more particularly to self-propelled sprinkler irrigation systems for irrigating comparatively large sections of land, and even more particularly to an electronic control system for maintaining articulately coupled sprinkler sections of a pivotal self-propelled irrigation system in substantial linear alignment.

There are many sections of the country where the agricultural products or crops are distributed over large expanses of land. The need for effectively irrigating, as well as fertilizing and spraying, these crops, has resulted in the development of self-propelled fluid distribution systems composed of a large number of articulately coupled fluid conduit sections which are reversibly driven along a defined, normally circular, path. The particular material to be distributed is then sprayed upon the crops from apertures located in the adjacent sections as the distribution system is translated or rotated along its path of travel.

The use of such a system for irrigating, by sprinkling, the crops has particularly proven to be advantageous and effective. It has generally been found that water supplied to the crops by sprinkling, rather than from irrigation ditches, tends to produce more of a soaking effect similar to that resulting from natural rainfall. Additionally, the use of a self-propelled, traveling sprinkler system is less expensive and more convenient than the use of a stationary sprinkling system, particularly when faced with the irrigation of crops distributed over large expanses of land.

One type of self-propelled sprinkler type irrigation system of the foregoing described general nature is often referred to as a pivotal irrigation system, and consists of a plurality of pivotally coupled adjacent sprinkler sections, all of the sections extending for a typical distance of approximately one-quarter of a mile. Each of the sections are normally supported by wheeled carriages or supports respectively driven by reversible electric motors, rotating the entire string of sprinkler pipes in one direction or the other along an arcuate sprinkling path. The water supply may be disposed at the center of rotation of the system and is conveyed by suitable conduits to each of the sprinkler sections to be respectively discharged through nozzles thereof to the land and crops during rotation.

It is necessary, as may be apparent, that during the rotation of the entire system along its defined circular path, each of the adjacent sprinkler sections should be maintained in substantial alignment along a line generally corresponding to the radius of the circular path. Since each of the sprinkler section supports are normally driven by constant speed motors, and the linear velocity of each section along the arc of travel is dependent upon its distance from the center of rotation, this required alignment is conveniently maintained by allowing the furthermost motor to run continuously, while intermittently energizing the motors driving the intermediate sections in response to the angular variations (misalignment) between adjacent sections. At present, this alignment control is effected solely by mechanical or electromechanical means, normally requiring the use of guy cables and/or cam operated switches. While these techniques have generally served the intended purposes, they have not been entirely satisfactory for all conditions of service.

It is therefore a principal object of the invention to provide a new and improved control system for maintaining the alignment of adjacently coupled fluid conduit sections of a self-propelled fluid distribution system.

It is a further object of the invention to provide new and improved pivotal irrigation apparatus.

It is a still further object of the invention to provide an all-electric solid-state control network for selectively energizing electrical drive motors associated with support assemblies for articulated sprinkler sections of a self-propelled sprinkler irrigation system to maintain the sections in substantial linear alignment.

In accordance with these and other objects, the present invention is directed to an all electronic alignment control system for maintaining substantially linear alignment between pivotally coupled fluid conduit sections being reversibly driven in a generally horizontal drive plane and for interrupting power to the drive means associated with the sections when adjacent sections pivot into excessive misalignment. The system includes means coupled to the sections for producing an electrical signal indicative of the occurrence and angular direction of the relative pivotal movement of adjacent sections out of alignment, means for producing an electrical signal indicative of the direction in which the sections are being driven, and means for selectively energizing the drive means in response to and in accordance with the respective states of the aforementioned signals. In accordance with alternate preferred embodiments of the invention, the pivotal detector may include a photodetector sensor assembly having light source means, light detector means, and a movable light interrupter for generating the required electrical signal; or may include a potentiometer sensor assembly having a wiper arm pivotally movable in response to the relative pivotal movement of adjacent sections.

These and other features, advantages, and objects of the invention will become more readily understood from the following detailed description taken in conjunction with the attached drawings wherein like numerals refer to corresponding parts and wherein.

Figure 1:
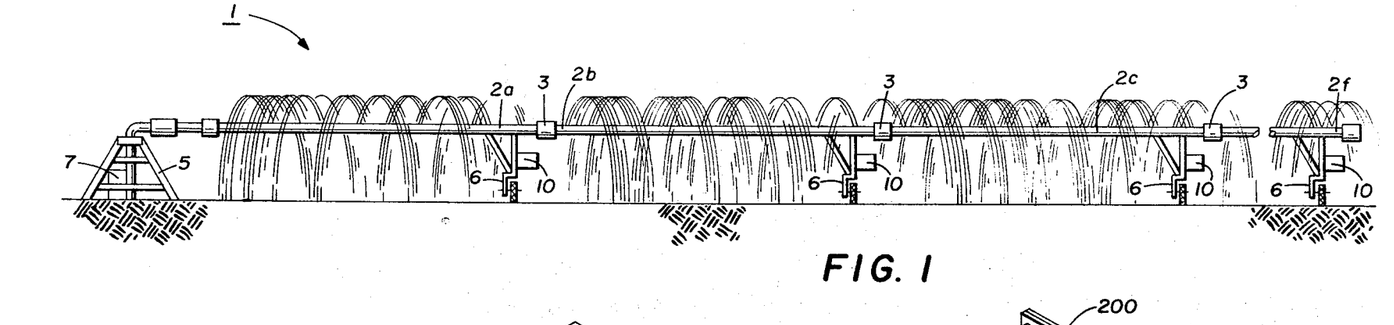
FIG. 1 is an elevational view of coupled fluid conduits of a pivotal irrigation system.

Referring now to the drawings, and initially to FIG. 1, there is depicted one form of self-propelled sprinkler irrigation apparatus 1, particularly of the pivotal type, which utilizes the control system of the present invention. It is pointed out that the representation of the apparatus shown in FIG. 1 is merely diagrammatical, no attempt being made to show the specific detailed construction thereof inasmuch as the apparatus itself is conventional. Furthermore, it is to be understood that while the illustrated apparatus is of the pivotal type (rotating about a fixed point), the principles of the invention described hereinafter are equally applicable to linearly movable self-propelled apparatus composed of articulately coupled sections.

Accordingly, the apparatus 1 generally includes a string of adjacent pipe or sprinkler sections 2a, 2b, 2c, etc., adjacent sections pivotally and articulately coupled in any conventional manner at intersections or coupling situses 3. The entire string of sprinkler sections is coupled to, and adapted to rotate about, a central fixed station 5, each section having a wheeled support means 6 respectively propelled by reversible constant speed motor means 10 operatively coupled thereto, the entire apparatus 1 thus being propelled in a generally horizontal drive plane with respect to the ground.

Suitable means 7 are provided at the central station 5 for supplying water to the string of pipes or sprinkler sections 2a, 2b, etc., it being understood that each of the sections are in fluid communication with one another. The water from the source 7 is then distributed to the crops or land, as the string of pipes is driven along its sprinkling path, by way of conveniently spaced apertures or nozzles disposed within each of the sections 2a, 2b, etc. Since outer sections (for example 2f, 2e, 2d etc.) will travel at a different linear velocity than the inner sections (2a, 2b, 2c etc.), the apertures or nozzles in adjacent sections may be of varying frequency and size to establish a uniform sprinkling distribution pattern along the area being irrigated.

Figure 2:
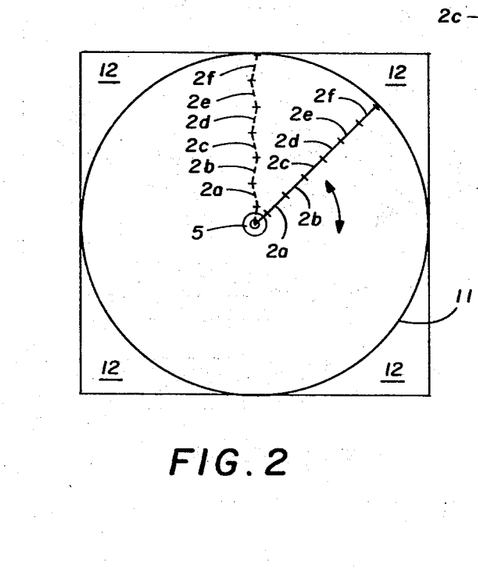
FIG. 2 is a schematic plan view illustrating the operation of the apparatus of FIG. 1.

As depicted in FIG. 2, the string of sprinkler sections is propelled about the central station 5 in an arcuate or circular path in either the clockwise or counterclockwise direction (as indicated by the arrow) to thereby irrigate, by sprinkling, the land enclosed within the circle 11. Effective irrigation of the corner portions 12 may be effected, as conventionally known, by selectively activated end guns or nozzles coupled to the outermost sprinkler section 2f. In accordance with the preferred method of operation, each of the sections 2a–2f would be driven by separate reversible AC motors, all motors being initially operative to propel their associated sections in the same rotational direction when the string is to be driven in one direction (for example clockwise); all of the motors thereafter being simultaneously reversed to propel sections in the same rotational direction as the entire string is driven in the counterclockwise direction. In operation, this reversing action will normally occur after the irrigation apparatus has made a complete revolution (360°).

As the apparatus 1 is rotated along its sprinkling path, the motor coupled to the outermost section 2f is normally continuously energized to act as the "pacemaker." During this rotation, adjacent sections will normally lag one another and tend to take on the misaligned configuration represented by the dashed line representation in FIG. 2. To compensate for this misalignment, and to effect the desired straight line configuration represented by the solid line representation in FIG. 2, the motors associated with the intermediate sections 2a–2e are selectively and intermittently energized, this selective energization being effected in response to the angular relationship between adjacent sections as well as the rotational direction that the pipe sections are presently rotating, all as subsequently described. Furthermore, in the event that one or the other of the sprinkler sections excessively lags the other, all of the motors (including the outermost or leading motor) will be shut down and the entire system automatically turned off until such excessive misalignment can be corrected. It is the control system for maintaining this alignment and responding to excessive misalignment to which the present invention is primarily directed.

Figures 6, 7:
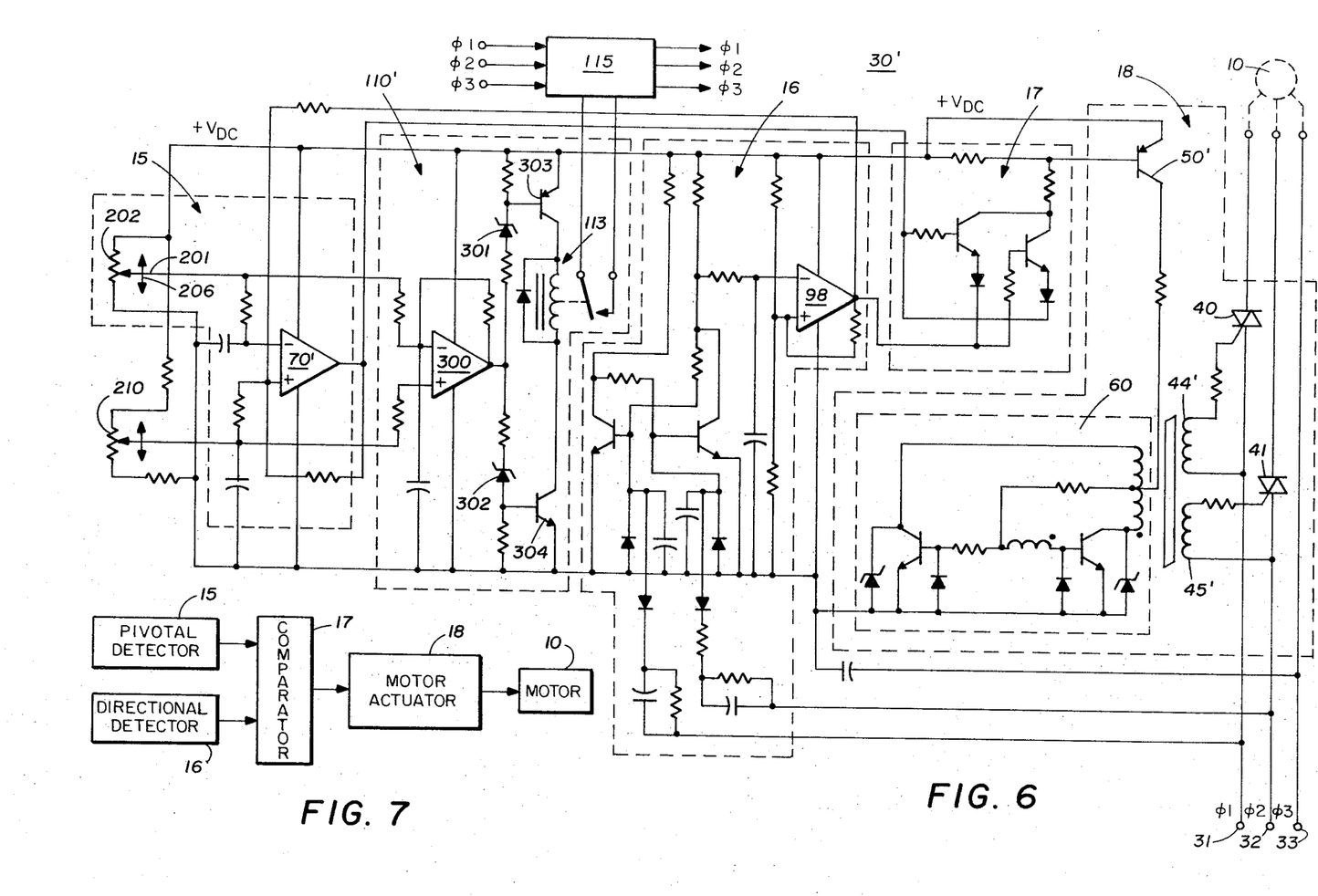
FIG. 6 is an electrical schematic diagram of an alignment control system in accordance with another embodiment of the invention, specifically adapted to be used in conjunction with the apparatus in FIG. 4.
FIG. 7 is an overall block diagram of the alignment control system of the present invention.

The concept of the operation of the control system of the present invention is broadly depicted in FIG. 7. In accordance with that concept, pivotal detector means 15 produces an output electrical signal indicative of the occurrence and direction of the relative pivotal movement of adjacent intermediate sprinkler sections out of the desired linear alignment shown in FIG. 2. Additionally, directional detector means 16 produces an output electrical signal indicative of the rotational direction in which the string of sprinkler sections is currently being propelled. These electrical signals are then inputted to a comparator means 17 which compares them and produces an appropriate output signal to a motor actuator means 18 when the so-compared signals indicate that the actuation of the motor 10 will bring the adjacent intermediate sections into alignment. The motor actuator 18 then, in response thereto, energizes the motor 10.

Figure 3:
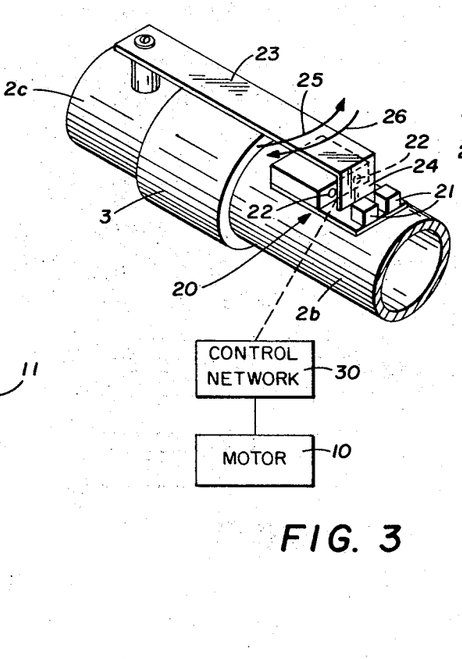
FIG. 3 is a pictorial view of one preferred embodiment of a pivotal detector coupled to adjacent fluid conduit sections, and including a photodetector sensor assembly.
Figure 5:
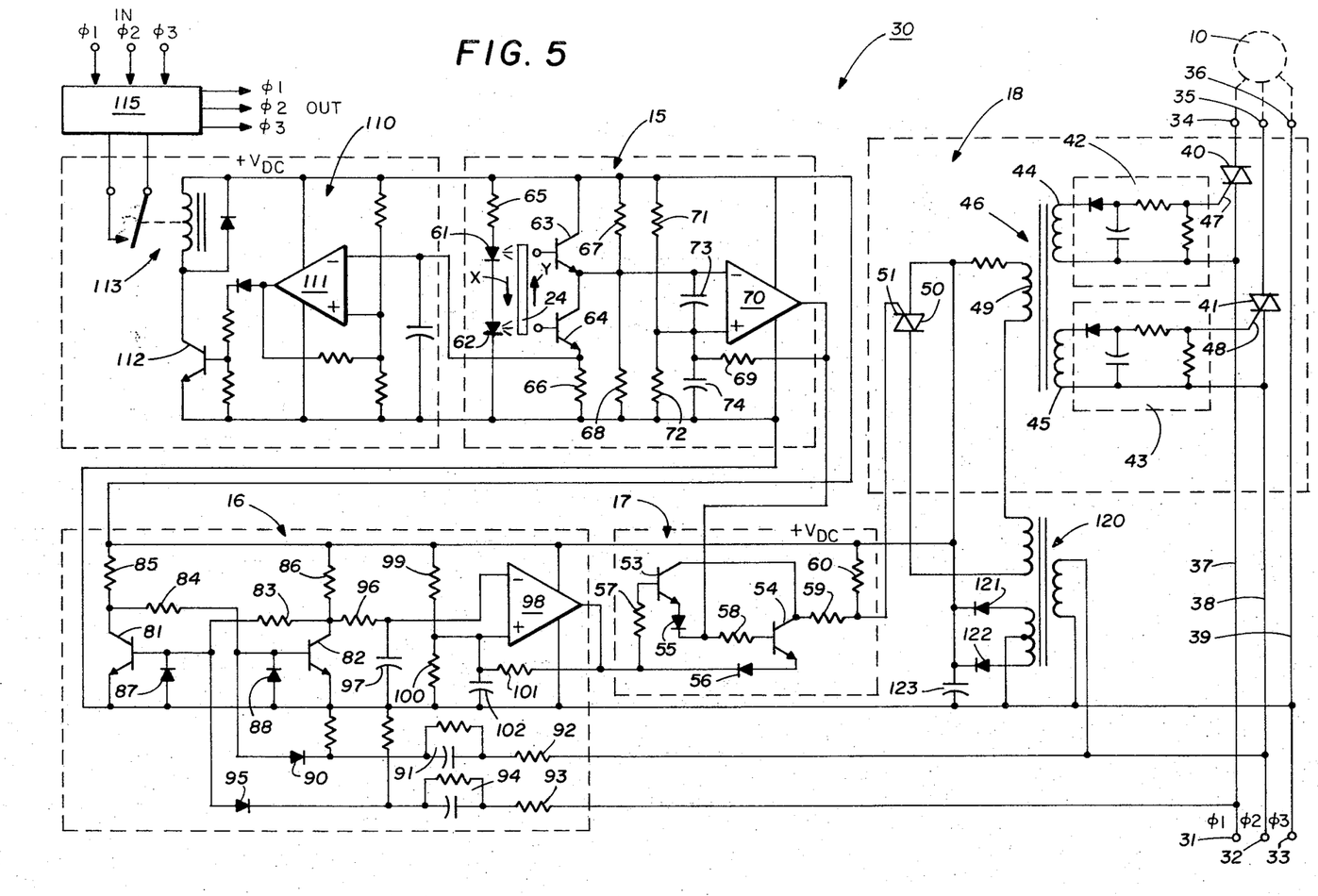
FIG. 5 is an electrical schematic diagram of an alignment control system in accordance with one embodiment of the invention, specifically adapted to be used in conjunction with the apparatus illustrated in FIG. 3.

Attention is now directed to FIGS. 3 and 5 which together illustrate a first preferred embodiment of the alignment control system of the present invention. With specific reference to FIG. 3, a photodetector sensor assembly 20 is mounted in any convenient manner to one of the pipe sections (for example 2b) near the intersection 23 of its pivotal and flexible connection with an adjacent pipe section (for example 2c). The assembly includes a pair of housings 21 in which are disposed a pair of light sources respectively directed at a pair of light sensors 22.

Rigidly coupled to the pipe section 2c is an arm 23 cantilevered over the intersection 3 and having a downwardly extending vane segment 24 disposed intermediate the light sources and light sensors. The arm 23 is linearly aligned with the longitudinal axis (radial direction of the circular path illustrated in FIG. 2) of the section 2c, the vane segment 24 effectively blocking light emitted from housings 21 from reaching either of the sensors 22 when the section 2c is linearly aligned with the adjacent section 2b (straight line representation shown in FIG. 2), as illustrated in the position depicted in FIG. 3. When the pipe section 2c, however, pivots out of this linearly aligned position, the vane will correspondingly pivot (in either the direction represented by the arrow 25 or the arrow 26) and the vane 24 will correspondingly move to uncover one or the other, or both, of the sensors 22. This result will similarly occur, of course, when the section 2b pivots out of linear alignment with section 2c. As previously mentioned, this pivotal movement occurs as a result of one or the other of the sprinkler sections lagging its adjacent section as depicted by the dashed line representation in FIG. 2. The exposure of the light sensors 22 consequently produces output electrical signals effective to actuate the control network 30 coupled to the motor 10 associated with the section 2b, for example, in accordance with the following description.

Referring now to FIG. 5, the control network employed in conjunction with the photodetector sensor assembly 20 is generally represented by the reference numeral 30. Accordingly, three-phase power is respectively coupled between the power input terminals 31, 32, and 33 to input terminals 34, 35, and 36 of the AC motor 10 by way of power lines 37, 38, and 39. Disposed within two of these lines, for example 37 and 38, are a pair of switches 40 and 41 which, when closed, actuate the motor 20. The switches 40 and 41, along with the other components disposed within the dashed outline referenced by the numeral 18, provide the motor actuator network means 18 illustrated in FIG. 7.

Any type of switches 40 and 41 may be utilized which, until closed, prevent the transmission of power to the motor 10. In accordance with a preferred feature of the present invention, however, switches 40 and 41 are solidstate triacs. As conventionally known, a triac is essentially a bi-directional three terminal multi-layer semiconductor device which is triggered into conduction by the application of a signal to its gate.

Simultaneus gating of the triacs 40 and 41 is effected in response to gating current at the output of a half-wave rectifier and filter networks 42 and 43 (which are respectively coupled to secondary windings 44 and 45 of a transformer 46) being applied to the gate terminals 47 and 48 of the triacs. As subsequently described in greater detail, the DC gating current produced at the output of the networks 42 and 43 occurs in response to the gating of a triac switch 50 into conduction, and the consequent current flow through the primary winding 49 of the transformer 46. It is significant to note that the networks 42 and 43 are effectively isolated from one another as well as from the line voltages.

Coupled to the gate 51 of the triac 50 is the output from a logic network disposed within the dashed outline 17 which corresponds to, and provides the function of, the comparator means 17 shown in FIG. 7. Accordingly, the network 17 comprises a pair of NPN transistors 53 and 54, diodes 55 and 56, and resistors 57–60 connected in the manner illustrated in FIG. 5 to provide an Exclusive-OR logic function. The pair of inputs to the logic network 17 are respectively provided by the output from the pivotal detection network portion 15 and the directional detector network portion 16. As before, these respective network portions correspond to, and provide the function of, respective means 15 and 16 of FIG. 7.

As previously mentioned, the detection network 15 is effective to generate electrical output signals from means 70, the states of which are indicative of when the adjacent sections (for example 2b and 2c) are substantially aligned as well as when these sections are angularly displaced (pivoted) with respect to one another and in which angular direction they are so displaced. Accordingly, the network 15 comprises, as the light sources disposed within housings 21 (FIG. 3), a pair of light emitting diodes 61 and 62; and, as the light sensors 22, phototransistors 63 and 64, the vane 24 being movably disposed therebetween. The series connected diodes 61 and 62 are coupled across the positive DC voltage supply $V_{DC}$, along with the current limiting resistor 65. Similarly, the phototransistors 63 and 64 are connected in series, along with a resistor 66 (the function of which will be subsequently described) across the DC voltage supply. 67 and 68 respectively provide the load resistors for the phototransistors 64 and 63.

The outputs from transistors 63 and 64 are coupled to the inverting input terminal of an operational amplifier 70, an appropriate signal voltage of respective levels being produced at the output of 70 in response to the conduction of either the phototransistor 63 or 64, or the non-conduction of either. A voltage divider provided by resistors 71 and 72 establishes the desired bias of the non-inverting terminal of the operational amplifier 70. Resistor 69 provides positive feedback for the operational amplifier, and capacitors 73 and 74 provide conventional filtering functions.

The detection network 16 is to provide appropriate output signals therefrom indicative of which direction the motor 10 will propel its driven section (direction of current rotation of pipe string 1). For this purpose, the network 16 illustrated in FIG. 5 is a phase detection network detecting the relative phase relationship of the line voltages at the terminals 31 and 32. While various type networks can be utilized for this function, in accordance with the specific feature herein, the unique phase detection network illustrated in FIG. 5 is employed. Accordingly, the network essentially comprises a pulse width modulated flip-flop, which trigger pulses are derived from the AC lines 37 and 38 (corresponding to the phase voltages $\phi_1$ and $\phi_2$). The flip-flop is essentially provided by the transistor switches 81 and 82, the base of each being respectively coupled through resistors 83 and 84 to the collector terminal of the other transistor. Resistors 85 and 86 respectively provide the load resistors for the transistors 81 and 82. Diodes 87 and 88 are respectively coupled to the base of each transistor 81 and 82 to prevent the reverse biasing of the emitter-base junction of each transistor during non-conduction. Trigger pulses to the transistors 81 is furnished by way of resistor 92, RC network 91, and reverse-biased diode 90. Similarly, trigger pulses to the transistor 81 is provided by way of resistor 93, RC network 94, and reverse biased diode 95.

The output from the flip-flop is averaged and filtered by way of resistor 96 and capacitor 97, and applied to the inverting input terminal for producing output signal voltages corresponding to the phase relationship between the line voltages of the operational amplifier 98. A voltage divider provided by resistors 99 and 100 establishes the desired bias of the non-inverting terminal of the operational amplifier; and resistor 101 provides the positive feedback therefor, filter capacitor 102 being coupled to the non-inverting terminal.

Coupled to the detection network 15 intermediate the resistor 66 and transistor 64 emitter is an "over travel" network portion 110 which is effective to disconnect the power to all motors 10 and shut down the entire system whenever excessive misalignment occurs between adjacent sprinkler sections. The network 110 comprises an operational amplifier 111 having its inverting input coupled at the intersection of the emitter terminal of the phototransistor 64 and resistor 66, its output coupled through a dioderesistor leg to the base of a transistor switch 112. The collector output of the transistor 112 is then coupled to a normally opened relay 113 in the manner illustrated in the drawing. Closing of the relay contacts then prevents the transfer of input power to a conventional terminal board 115 from being outputed therefrom to all of the motors, thus providing the desired power interruption.

The DC voltage supply for the various networks can be provided in various conventional manners. For example, as illustrated in the drawing, the requisite DC is provided by way of a transformer 120 having its primary winding coupled across power lines 38 and 39; and a full wave rectifying network including diodes 121 and 122 and filter capacitor 123.

The operation of the network 30 is now described. Referring back to FIGS. 1 and 2, assume that adjacent sections 2b and 2c have the angle of misalignment as illustrated by the dashed representation in FIG. 2. Provided that the pipe string is being propelled in the counterclockwise direction, alignment between adjacent sections 2b and 2c can be effected by turning on the motor 10 coupled to the section 10b until the required linear alignment is achieved between these two sections. On the other hand, if the system is being driven in the clockwise direction, the motor 10 coupled to the section 2b should remain off to avoid even further misalignment. Similarly, in the case of the angular misalignment illustrated with respect to the adjacent sections 2a and 2b, the motor coupled to section 2a should be turned off if the system is moving in the counterclockwise direction, but should be actuated when the system is moving in the clockwise direction.

Thus, to effect the requisite alignment between adjacent intermediate sections, actuation of the motor 10 by network 18 occurs solely in response to a control signal from the logic network 17, which produces the control signal only after comparing the direction of angular misalignment between between the adjacent sections (represented by the state of the electrical signal at the output of network 15) with the relative phase relationship between $\phi_1$ and $\phi_2$ indicating the direction of motor travel (represented by the state of the electrical signal at the output of network 16).

Specifically, and in accordance with the operation, assume that the adjacent sections have the sensor assembly mounted as shown in FIG. 3. When the adjacent sections pivot into misalignment the angular relationship represented by 2b and c of FIG. 2, the vane 24 is consequently caused to move in the direction of arrow X (FIG. 5) to initially uncover the light emitter 61. On the other hand, pivotal movement of adjacent sections to angular misalignment represented by 2a and 2b causes the vane 24 to move in the direction of arrow Y to initially uncover light emitter 62. Also, it is assumed that for purposes of this description, the motors 10 are effective to drive the string of sections in the counterclockwise direction when the voltage phases $\phi_1$ and $\phi_2$ are 120° apart; and in the clockwise direction when $\phi_1$ and $\phi_2$ are 240° apart.

Under the aforestated conditions, when the adjacent pipe sections are linearly aligned, light from the diodes 61 and 62 are effectively blocked by the vane 24 from reaching the phototransistors 63 and 64, the transistors 63 and 64 are not conducting. When adjacent sprinkler sections pivot to the previously defined angular relationship to uncover diode 61, this results in the conduction of phototransistor 63. Conduction of the phototransistor 63 raises the voltage level at the inverting terminal of the operational amplifier 70, causing the voltage at its output to decrease to a predetermined low level (designated, for example, by a logic level "−1"). Conversely, when adjacent sprinkler sections pivot toward the previously defined angular relationship to uncover diode 62, this results in the conduction of phototransistor 64. Conduction of phototransistor 64 reduces the voltage at the inverting terminal of the operational amplifier 70, and raises the voltage at the output of the operational amplifier 70 to a predetermined high level (designated by the logic state "1").

With respect to the operation of phase detector network 16, it is observed that when the phase relationship between the line voltages is such that $\phi_1$ and $\phi_2$ are 120° apart (counterclockwise rotation of pipe string) transistor 82 is conducting (and transistor 81 is "off") for a shorter period of time that when $\phi_1$ and $\phi_2$ are 240° apart (clockwise rotation of pipe string). Thus, the resultant voltage buildup across the capacitor 97 will be less for a phase difference of 120° and will have a higher voltage thereacross for a phase difference of 240°. The lower voltage across the capacitor 97, being applied to the inverting input terminal of the operational amplifier 98, thus produces a relatively high voltage at the amplifier 98 output (corresponding to a logic level "1") when the phases are 120° apart; the output voltage from the operational amplifier 98 being relatively low (corresponding to the logic level "−1") for a phase relationship of 240°.

The logic network 17 is then effective to produce a control or gate signal for triggering the triac 50 into conduction when the state of the signal from network 15 is high (logic level "1") and the state of the voltage signal from network 16 is simultaneously low (logic level "−1"); or when the signal state from network 15 is low (−1) and the input pulse from network 16 is high (+1). On the other hand, when the voltage levels from both networks 15 and 16 are both high or both low, the triac 50 remains ungated and is in a non-conducting state. As previously described, the conduction of the triac 50 results in the simultaneous conduction of the triacs 40 and 41, and turns on motor 10.

The operational cycle can be summarized as follows:

| Pivotal Relationship of Adjacent Sections | Rotational Direction of Sprinkler Sections | Detector 15 Output | Detector 16 Output | Motor 10 |
|---|---|---|---|---|
| 61 Uncovered 62 Covered | CCW | −1 | +1 | Turned ON |
| 61 Uncovered 62 Covered | CW | −1 | −1 | Turned OFF |
| 62 Uncovered 61 Covered | CCW | +1 | +1 | Turned OFF |
| 62 Uncovered 61 Covered | CW | +1 | −1 | Turned ON |
| Aligned 61 Covered 62 Covered | | | | Remains UNAFFECTED |

As a unique feature of the present invention, when adjacent sprinkler sections are angularly displaced with respect to one another in either pivotal direction to such a degree that both light emitters 61 and 62 are uncovered, this excessive misalignment results in the conduction of both phototransistors 63 and 64, the consequent voltage drop across resistor 66 increasing to a substantially higher value than when only one of the phototransistors are conducting. This excessive voltage is applied at the inverting terminal of the operational amplifier 111, causing the voltage at the output of the operational amplifier 111 to be lowered, turning transistor 112 "off." This consequently results in relay 113 becoming deenergized, closing its contacts, and interrupting power to all motors.

Figure 4:
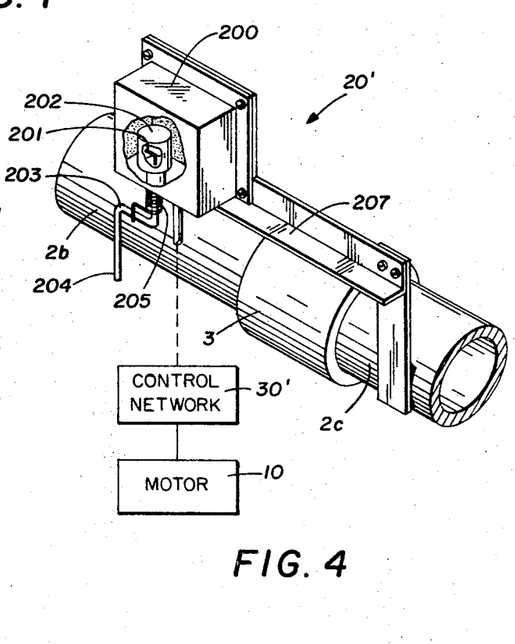
FIG. 4 is a pictorial view of an alternate preferred embodiment of a pivotal detector coupled to adjacent fluid conduit sections, and including a potentiometer sensor assembly.

Referring now to FIGS. 4 and 6, there is depicted an alternative preferred embodiment of the alignment control system of the present invention. Accordingly, the photodetector sensor assembly illustrated in FIG. 3 has been replaced by a potentiometer sensor assembly 20' consisting of a housing 200 cantilevered over the pipe section 2b by way of an arm 207 rigidly mounted to the adjacent pipe section 2c. The arm 207 is substantially linearly aligned with the longitudinal axis of the section 2c.

Disposed within the housing 200 is a conventional rotary wound potentiometer 202 (FIG. 6) along which a wiper arm 201 is adapted to slide. The wiper arm is disposed at the end of a rotatably mounted extension arm 203 having an offset depending leg 204 biased against the side of pipe section 2b by a spring means 205. It is thus apparent that as the adjacent sections 2b and 2c pivot out of alignment with respect to one another in either angular direction, the arm 203 will rotate, causing the wiper arm to travel along the potentiometer in one or the other of the directions represented by the arrow 206 (FIGS. 4 and 6), depending upon the direction of relative pivotal movement of the adjacent sprinkler sections. The movement of the wiper arm 201 is thus effective, in conjunction with the rest of the control network 30' illustrated in FIG. 6, to selectively actuate motor 10 associated with section 2b, for example, in a manner similar to that previously described.

Referring specifically to FIG. 6, the pivotal detector 15 is now provided by the potentiometer 202 (and wiper arm); operational amplifier 70'; and associated resistors and capacitors illustrated within the dashed outline designated as 15. The bias of the non-inverting terminal of the amplifier is established by an auxiliary potentiometer 210.

As the adjacent sections 2b and 2c pivot out of alignment toward an angular relationship which increases the voltage output from the potentiometer (which would correspond to the uncovering of light emitter 61), the resulting voltage increase at the inverting terminal of the operational amplifier 70' produces a low level (−1) signal at its output. On the other hand, pivoting of adjacent sections 2b and 2c in the opposite direction decreases the voltage output from the potentiometer (corresponding to the uncovering of light emitter 62), thus producing a higher level (+1) signal at the amplifier output.

As previously described, the output from the detector network 15 is applied, along with the output from the phase detector network 16, to the logic comparator 17 which, as previously described, compares the states of the input signals for selectively producing the output to the motor actuator. It is noted that the phase detector network 16 and the logic network 17 of control network 30' is essentially the same as those networks depicted in FIG. 5.

The motor actuator network means 18 of the control network 30' is of a different configuration than that previously described with reference to the control network 30. Specifically, and with reference to FIG. 6, the actuator network 18 includes a transistor switch 50°, the output of which is coupled to a high frequency, free running, magnetic multivibrator 60 which is coupled by way of secondary windings 44' and 45' to the gate terminals of the triac switches 40 and 41. Upon the occurrence of an output signal from the logic network 17, the transistor switch 50' conducts, the resulting DC current actuates the multivibrator for generating the required AC voltage across the primary winding, the resulting secondary winding voltages triggering the switches 40 and 41 into simultaneous conduction for actuation of the motor 10. In the manner previously described, the absence of the control signal at the output of the network 17 turns the motor 10 off.

The overtravel network of the network 30' illustrated in FIG. 6 within the dashed outline 110' offers adjustment advantages not present in the network 110 illustrated in FIG. 5. Accordingly, the network 110' includes an operational amplifier 300 having its inverting terminal coupled to the potentiometer 202 and its non-inverting terminal coupled to the potentiometer 210. The output from the amplifier 300 is coupled in the manner illustrated through respective zener diodes 301 and 302 to the base inputs of PNP and NPN transistors 303 and 304. The collector outputs of the transistors 303 and 304 are then coupled to the normally opened relay 113.

The bias to the non-inverting terminal of the amplifier 300 is established by the potentiometer 210 adjustment so that a predetermined range of voltages from the output of the potentiometer 202 (representing allowed range of angular misalignment) will be such that no signal pulse is generated at the output of the amplifier 300, and the resulting conduction of transistors 303 and 304 maintain the relay 113 in its opened position. When the rotation of the wiper in either direction results in the voltage output from the potentiometer 202 exceeding this voltage range (representing excessive misalignment of the adjacent sprinkler systems), a voltage signal is produced at the output of the amplifier 300 (+1 or −1) turning off either transistor 303 or 304, thus deenergizing the relay 113 and closing its contacts to interrupt the power to the motors 10.

Various other modifications may be made to the disclosed embodiments of the invention, as well as alternate embodiments may be provided, without departing from the spirit and scope of the invention as defined by the appended claims.

What is claimed is:

1. In self-propelled sprinkler irrigation apparatus of the type comprising, in operative combination, elongated fluid distribution means provided by a plurality of articulately coupled sprinkler sections pivotally movable with respect to one another, said fluid distribution means adapted for rotation about a central point along a circular path; respective drive means associated with each of said sections which, when actuated, propel sections along said circular path; and alignment control means for maintaining adjacent ones of said sections substantially aligned with respect to one another, during said rotation, along a line corresponding to the radius of said circular path, the improvement wherein said alignment control means comprises:

a. first sensor means for detecting the relative pivotal movement of adjacent sections with respect to one another out of said alignment and producing a first electrical signal indicative of said misalignment, said first sensor means comprising pivotal detection means responsive to the said relative pivotal movement and signal generating means for producing said first electrical signal, said signal generating means being operatively responsive to the movement of said pivotal detection means into and out of noncontact communication with said signal generating means; and b. electronic control means for actuating one of said drive means in response to said first electrical signal, thereby to propel its associated section into alignment with said adjacent section.

2. The improvement as defined by claim 1 wherein said first sensor means is disposed at the intersection of said adjacent sections.

3. The improvement as defined by claim 1 wherein said signal generating means comprises a phptodetector sensor assembly including light sensor means and light source means for directing light at said light sensor, and said pivotal detection means comprises light interrupting means operatively movable into and out of light interrupting relationship with said light source and said light sensor, said operative movement being in response to the pivoting of said adjacent sections into and out of said alignment.

4. The improvement as defined by claim 3 wherein said operative movement is effective to move said light interrupting means out of said light interrupting relationship with said light source and said light sensor; and means are coupled to said light sensor to produce said first electrical signal when said adjacent sections are out of said alignement.

5. In self-propelled sprinkler irrigation apparatus of the type comprising, in operative combination, elongated fluid distribution means provided by a plurality of articulately coupled spinkler sections pivotally movable with respect to one another, said fluid distribution means adapted for roation about a central point along a circular path; respective drive means associated with each of said sections which, when actuated, propel sections along said circular path; and alignment control means for maintaining adjacent ones of said sections substantially aligned with respect to one another, during said rotation, along a line corresponding to the radius of said circular path, the improvement wherein said alignment control means comprises:

a. first sensor means for detecting the relative pivotal movement of adjacent sections with respect to one another out of said alignment and producing a first electrical signal indicative of said misalignment, said first sensor means comprising pivotal detection means responsive to the said relative pivotal movement and signal generating means for producing said first electrical signal, said pivotal detection means being in continuous movable contact with said signal generating means during the said relative pivotal movement of said adjacent sections in either one of the two opposite directions of misalignment, the first electrical signal being produced in response to the movable contact of said pivotal detection means and when said adjacent sections reach a minimum degree of misalignment in either of said two opposite directions; and b. electronic control means for actuating one of said drive means in response to said first electrical signal, thereby to propel its associated section into alignment with said adjacent section.

6. The improvement as defined by claim 5 wherein said first sensor means is disposed at the intersection of said adjacent sections.

7. The improvement as defined by claim 5, wherein said first sensor means is a potentiometer sensor assembly having wiper arm means operatively coupled to one of said adjacent sections to vary the output voltage from said potentiometer in response to the pivotal movement of adjacent sections into and out of said alignment; and means are coupled to said potentiometer to produce said first electrical signal when said adjacent section reach said minimum degree of misalignment.

8. In self-propelled sprinkler irrigation apparatus of the type comprising, in operative combination, elongated fluid distribution means provided by a plurality of articulately coupled sprinkler sections pivotally movable with respect to one another, said fluid distribution means adapted for rotation about a central point along a circular path; respective drive means associated with each of said sections which, when actuated, propel sections along said circular path; and alignment control means for maintaining adjacent ones of said sections substantially aligned with respect to one another, during said rotation, along a line corresponding to the radius of said circular path, the improvement wherein said alignment control means comprises:

a. first sensor means for detecting the relative pivotal movement of adjacent sections with respect to one another out of said alignment and producing a first electrical signal indicative of said misalignment, b. electronic control means for actuating one of said drive means in response to said first electrical signal, thereby to propel its associated section into alignment with said adjacent section, and c. second sensor means for detecting the rotational direction which said drive means, if actuated, will propel its associated section along said circular path and producing a second electrical signal having states indicative of said rotational direction.

9. The improvement as defined by claim 8 wherein said first sensor means comprises a photodetector sensor assembly including light sensor means, light source means for directing light at said light sensor, and light interrupting means operatively movable into and out of light interrupting relationship with said light source and said light sensor, said operative movement being in response to the pivoting of said adjacent sections into and out of said alignment.

10. The improvement as defined by claim 8 wherein said first sensor means is a potentiometer sensor assembly having wiper arm means operatively coupled to one of said adjacent sections to vary the output voltage from said potentiometer in response to the pivotal movement of adjacent sections into and out of said alignment; and means are coupled to said potentiometer to produce said first electrical signal when said adjacent sections reach said minimum degree of misalignment.

11. The improvement as defined by claim 8 wherein said drive means are reversible alternating current motors and said second sensor means detects said relative rotational direction by sensing the phase relationship of supply voltages to said motors.

12. The improvement as defined by claim 8 wherein the first electrical signal from said first sensor means has states indicative of which of two angular directions the said adjacent sections are in pivotal misalignment, and said electronic control means further includes comparator means coupled to said first and second electrical signals to actuate said drive means only when the so-compared electrical signals indicate that the actuation of said drive means will propel its associated section into alignment with the adjacent section.

13. The improvement as defined by claim 12 further including means coupled to said first sensor means for interrupting power to all of said drive means when said adjacent sections are in excessive pivotal misalignment.

14. The improvement as defined by claim 12 wherein said first sensor means comprises a photodetector sensor assembly including light source means, light sensor means, and light interrupting means operatively movable between a first position to allow light from said light source means to impinge upon said light sensor means and a second position for preventing the light from reaching said sensor means, said operative movement being in response to the pivoting of said adjacent sections into and out of said alignment.

15. The improvement as defined by claim 14 wherein said photodetector sensor assembly comprises two light sensors, two light sources respectively operatively paired with and focused at said two light sensors, and said light interrupting means is operatively movable out of light interrupting relationship with one of the paired sets of light sensors and light sources when said adjacent sections are pivoted in one of said angular directions and out of light interrupting relationship with the other paired set of light sensors and light sources when said adjacent sections are pivoted in the other angular direction.

16. The improvement as defined by claim 12 wherein said first sensor means is a potentiometer sensor assembly having wiper arm means operatively coupled to one of said adjacent sections to vary the output voltage from said potentiometer in response to the pivotal movement of adjacent sections into and out of said alignment, and means are coupled to said potentiometer to produce said first electrical signal when said adjacent sections reach a minimum degree of misalignment.

17. The improvement as defined by claim 16 wherein said wiper is movable in one direction when said adjacent sections are pivoted into misalignment in one of said angular directions and movable in an opposite direction when said adjacent sections are pivoted in the other angular direction, thereby to produce said first electrical signal having one or the other of the two states.

18. The improvement as defined by claim 15 further including means coupled to said photodetector sensor assembly for interrupting power to all of said drive means when said light interrupting means is operatively moved out of light interrupting relationship with both of said paired sets.

19. The improvement as defined by claim 17 further including means coupled to said potentiometer sensor assembly for interrupting power to all of said drive means when said wiper arm is moved in either direction beyond a predetermined range.

20. An electronic control system for maintaining substantially linear alignment of adjacent interconnected fluid conduit sections relatively pivotable with respect to one another in a generally horizontal drive plane, each of said adjacent sections having respective drive means coupled thereto, when energized, for propelling its coupled section in either one or the other of opposite directions in said drive plane, comprising:

a. first pivotal means operatively coupled to one of said adjacent sections for producing a first electrical signal having states indicative of the occurrence and angular direction of the relative pivotal movement of said adjacent sections out of said linear alignment, b. second directional detector means for producing a second electrical signal having states indicative of which of the said opposite directions a particular drive means will propel, if energized, its coupled section, and c. third means coupled to said first and second means for comparing the states of said first and second electrical signals and energizing said particular drive means when the so compared states indicate the energizing will bring said adjacent sections into alignment.

21. The control system as defined by claim 20 wherein said first pivotal detector means comprises pulse generating means having an input terminal and an output terminal, a pulse produced at said output terminal having one digital state when a voltage at the input terminal is of one magnitude and having a different digital state when the voltage at said input terminal is of a lesser magnitude, and means coupled to the said input terminal of said pulse generator for producing said voltages of said one or lesser magnitude in response to the pivoting of adjacent sections out of said linear alignment in one angular direction or in an opposite angular direction.

22. The system as defined by claim 21 wherein said voltage producing means coupled to the input of said pulse generating means is a pair of phototransistors respectively conducting during said one and said opposite angular pivotal direction.

23. The control system as defined by claim 22 wherein said pulse generator is an operational amplifier.

24. The control system as defined by claim 21 wherein said voltage producing means coupled to the input of said pulse generating means comprises variable resistance means, and a wiper movable along said variable resistance means for increasing or decreasing the resistance thereof in response to the pivoting of said adjacent sections out of said linear alignment in one or the opposite angular direction.

25. The control system as defined by claim 24 wherein said pulse generator is an operational amplifier.

26. The apparatus as defined by claim 21 wherein said second directional detector is a phase detection network for determining the relative phase relationship of supply voltages for said drive means.

27. The control system as defined by claim 26 wherein said phase detection network comprises a pulse generator having an input terminal and an output terminal, means coupled to said input terminal for producing said second electrical signal having one digital state when the phase relationship of the said supply voltages indicate that said drive means will be propelled in one of said opposite directions and a different digital state when said phase relationship indicates that said drive means will be propelled in the other opposite direction, said means comprising a pulse width modulated flip-flop having trigger pulses derived from said supply voltages.

28. The control system as defined by claim 22 wherein said phototransistors are coupled in series, and means are coupled to the output of one of said phototransistors for interrupting power to all of said drive means in response to the conduction of both phototransistors, the conduction of both phototransistors occurring as a consequence of excessive linear misalignment between adjacent sections.

29. The control system as defined by claim 24 wherein means are coupled to said variable resistance means for interrupting power to all of said drive means when said wiper is moved in either direction beyond a predetermined range representing excessive linear misalignment between adjacent sections.

30. The control system as defined by claim 20 wherein said third means comprises triggering means coupled to the output of a logic comparator effecting said comparing for selectively coupling supply voltages to said drive means.

31. The control system as defined by claim 30 wherein said selective coupling is by way of solid-state triacs selectively and simultaneously gated into conduction by said triggering means.

32. Alignment control system for pivotal irrigation apparatus of the type comprising elongated fluid distribution means provided by a string of sprinkler sections in end-to-end relationship relatively pivotable with respect to one another in a generally horizontal drive plane, said fluid distribution means adapted for rotation about a central point along a circular path, reversible alternating current motors for respectively propelling each of said sections simultaneously in the clockwise or counterclockwise direction on said drive plane along said circular path, one of said motors being actuated for continuously propelling an outer section along said path, a multiphase voltage supply for said motors, said alignment control system selectively and intermittently actuating motors associated with intermediate sections to maintain substantially linear alignment of adjacent sections in said horizontal drive plane and comprising:

a. a pivotal detector comprising a photodetector sensor assembly including photodetector means coupled to one of said sprinkler sections, said photodetector means including a pair of spaced light emitting diodes, a pair of phototransistors so spaced to respectively receive light from said light emitting diodes; light interrupting vane means conected to the adjacent section to said one section, said vane means extending over the intersection of said adjacent sections and so disposed with respect to said photodetector means to interrupt the light from reaching either phototransistors when said adjacent sections are linearly aligned, to allow light to reach one of the phototransistors to cuase said one phototransistor to conduct when the adjacent sections are pivoted out of said alignment in one angular direction, and to reach the other phototransistor and to cause said other phototransistor to conduct when the adjacent sections are pivoted out of said alignment in the other angular direction, b. first operational amplifier means coupled to said pivotal detector for producing a first electrical signal having first and second digital states respectively indicative of in which of said angular directions the adjacent sections are pivoted, c. a directional detector means for determining whether said secionts are being propelled in the said clockwise or counterclockwise directions, said directional detector comprising a phase detection network for determining the phase relationships of said multiphase voltage supply, comprising second operational amplifier means having an input terminal and an output terminal, pulse width modulated flip-flop means having trigger pulses derived from said multiphase voltage sypply lines coupled to said input terminal for producing a second electrical signal at said output terminal having first and second digital states respectively indicative of said clockwise and counterclockwise directions, d. logic ocmparator means having inputs thereto respectively coupled to said first and second operational amplifiers for comparing the states of said first and second electrical signals and generating a trigger signal when the so-compared states indicate that the actuation of the said motor will being said adjacent sections into said linear alignment, and e. triggering means responsive to said trigger signal for actuating switching means selectively coupling, when actuated, said voltage supply to said motors.

33. The control system as defined by claim 32 further including means coupled to said pivotal detector for interrupting said voltage supply to all of said motors when any of said adjacent sections are pivoted into excessive misalignment.

34. The control system as defined by claim 32 wherein said switching means are a pair of solid-state triacs disposed between said voltage supply and said motors.

35. The control system as defined by claim 34 wherein said triggering means comprises a free-running magnetic multivibrator having outputs therefrom coupled to said triacs.

36. Alignment control system for a pivotal irrigation apparatus of the type comprising elongated fluid distribution means provided by a string of sprinkler sections in end-to-end relationship relatively pivotable with respect to one another in a generally horizontal drive plane, said fluid distribution means adapted for rotation about a central point along a circular path, reversible alternating current motors for respectively propelling each of said sections simultaneously in the clockwise or counterclockwise direction on said drive plane along said circular path, one of said motors being actuated for continuously propelling an outer section along said path, a multiphase voltage supplfor said motors, said alignment control system selectively and intermittently actuating motors associated with intermediate sections to maintain substantially linear alignment of adjacent sections in said horizontal drive plane and comprising:

a. a pivotal detector comprising a potentiometer sensor assembly having wiper arm means rotatably coupled to one of said sprinkler sections to vary the output voltage from said potentiometer to one value when an adjacent section is in pivotal relationship thereto in one angular direction and to another value when said adjacent section is in pivotal relationship thereto in the other angular direction, b. first operation amplifier means coupled to said pivotal detector for producing a first electrical signal having first and second digital states respectively indicative of which of said angular directions the adjcent sections are pivoted,
c. a direction detector means for determining whether said sections are being propelled in the said clockwise or counterclockwise directions, said directional detector comprising a phase detection network for determining the phase relationships of said multiphase voltage supply, comprising section operational amplifier means having an input terminal and an output terminal, pulse width modulated flip-flop means having trigger pulses derived from said multiphase voltage supply lines coupled to said input terminal for producing a second electrical signal at said output terminal having first and second digital states respectively indicative of said clockwise and counterclockwise directions,
d. logic comparator means having inputs thereto respectively coupled to said first and second operational amplifiers for comparing the states of said first and second electrical signals and generating a trigger signal when the so-compared states indicate that the actuation of the said motor will bring said adjacent sections into said linear alignment, and
e. triggering means responsive to said trigger signal for actuating switching means selectively coupling, when actuated, said voltage supply to said motors.

37. The control system as defined by claim 36 further including means coupled to said pivotal detector for interrupting said voltage supply to all of said motors when any of said adjcent sections are pivoted into excessive misalignment.

38. The control system as defined by claim 36 wherein said switching means are a pair of solid-state triacs disposed between said voltage supply and said motors.

39. The control system as defined by claim 38 wherein said triggering means comprises a free-running magnetic multivibrator having outputs therefrom coupled to said triacs.

40. Phase detection network means for determining the relative phase relationship between two time-varying voltages, said network comprising a pulse width modulated flip-flop, means respectively coupling said time-varying voltages to a pair of inputs to said flip-flop for supplying trigger input pulses thereto, an operational amplifier having inverting and non-inverting terminals and an output terminal, capacitor means having one end coupled to the output of said flip-flop and said inverting input terminal, said capacitor means in combination with said flip-flop being effective to produce a voltage pulse athe said output terminal having one digital state when said two voltages are defined by one phase relationship and having a different digital state when state when said two voltages are defined by a different phase relationship.

* * * * *

UNITED STATES PATENT OFFICE
CERTIFICATE OF CORRECTION

Patent No. 3,823,730  Dated July 16, 1974

Inventor(s) John W. Sandstrom and Kenneth C. Cloud

It is certified that error appears in the above-identified patent and that said Letters Patent are hereby corrected as shown below:

Column 1, Line 38, before "extending", insert --together--.

Column 11, Line 23, "phptodetec-" should be --photodetec- --.

Column 12, Line 18, "section" should be --sections--.

Column 13, Line 9, after "second", insert --sensor means for comparing the respective states of said first and second--.

Column 15, Line 64, "cuase" should be --cause--.

Column 16, Line 10, "secionts" should be --sections--;

Line 23, "ocmparator" should be --comparator--;

Line 59, "supplfor" should be --supply for--.

Column 17, Line 11, "adjcent" should be --adjacent--.

Column 18, Line 7, "adjcent" should be --adjacent--;

Line 28, "athe" should be --at the--;

Line 31, delete "when state".

Signed and sealed this 3rd day of December 1974.

(SEAL)
Attest:

McCOY M. GIBSON JR.
Attesting Officer

C. MARSHALL DANN
Commissioner of Patents

FORM PO-1050 (10-69)